United States Patent [19]

Hill

[11] 3,785,240

[45] Jan. 15, 1974

[54] CHORD-TEACHING DEVICE FOR A STRINGED INSTRUMENT

[76] Inventor: Elgie E. Hill, Jost St., Bourbon, Mo. 65441

[22] Filed: May 14, 1973

[21] Appl. No.: 360,089

[52] U.S. Cl. ................................ 84/485, 84/471
[51] Int. Cl. .......................................... G10b 15/00
[58] Field of Search.................... 84/471, 473, 480, 84/485

[56] References Cited
UNITED STATES PATENTS

| | | | |
|---|---|---|---|
| 1,509,320 | 9/1924 | Schneider | 84/485 |
| 1,556,147 | 10/1925 | Johnson et al. | 84/485 |
| 2,001,191 | 5/1935 | Golden | 84/485 |
| 2,814,231 | 11/1957 | Jones | 84/485 |
| 3,668,967 | 6/1972 | Malis | 84/471 |
| 3,691,895 | 9/1972 | Nessler | 84/471 |

*Primary Examiner*—Lawrence R. Franklin
*Attorney*—Cohn, Powell & Hind

[57] ABSTRACT

A device for teaching chords for a stringed instrument including a stringboard having strings and frets. The device includes an elongate box having a front stringboard wall. A plurality of parallel rows extend longitudinally on the front stringboard wall, the rows representing the strings of the instrument. A plurality of parallel rows extend transversely of the string rows and represent frets of the instrument. A plurality of apertures are provided in regularly spaced, longitudinal alignment along each string row, and in regularly spaced, transverse alignment relative to the string rows. The elongate box further includes a card-supporting wall behind and spaced from the front stringboard wall to provide a slot behind the apertures. A chord card fits in the slot. This card includes a designation of a chord and a fret, an index for alignment with a fret row, and a designation of fingers located for alignment with appropriate apertures when the index is aligned with a fret row to indicate visually through the apertures the finger placement on the strings of the instrument.

7 Claims, 4 Drawing Figures

PATENTED JAN 15 1974 3,785,240
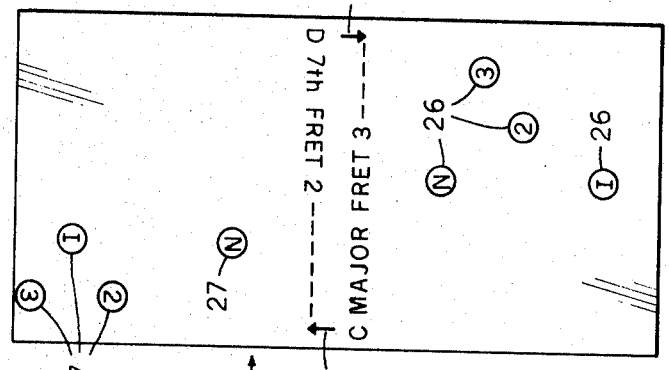
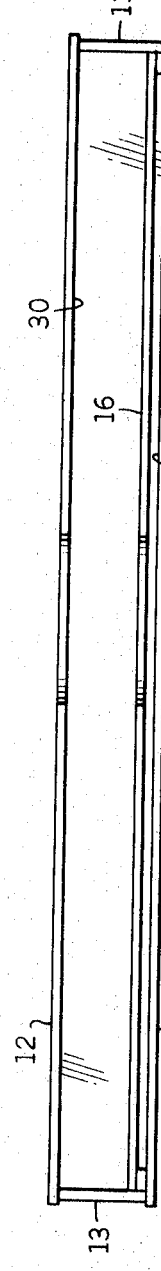
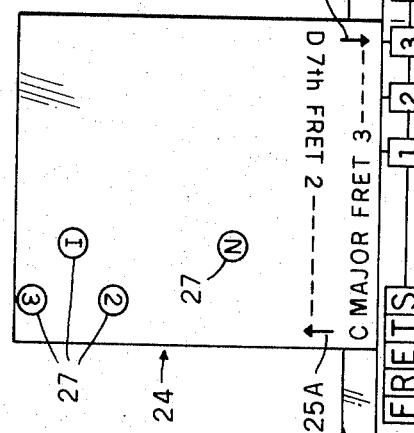
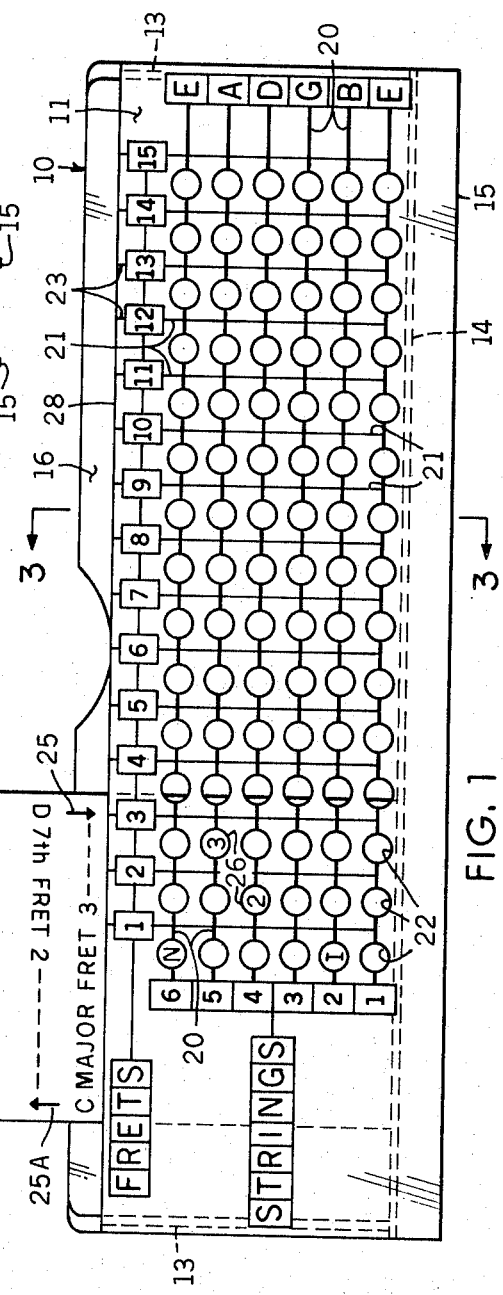

CHORD-TEACHING DEVICE FOR A STRINGED INSTRUMENT

BACKGROUND OF THE INVENTION

The prior devices for teaching chords for a stringed instrument, such as a guitar, utilize movable slides or cards that fit over a simulated stringboard, the slides or cards being provided with holes to indicate the strings held and the finger to be used. In these devices, because the slides or cards are located over the stringboard, portions of the simulated stringboard are hidden behind the movable slides or cards, and the finger designations are not sighted through the holes provided in such movable slides or cards.

SUMMARY OF THE INVENTION

The present device for teaching chords for a stringed instrument such as a guitar having strings and frets, includes an elongate box having a front stringboard wall. A plurality of parallel rows extend longitudinally on the front stringboard wall, and represent the strings of the instrument. A plurality of parallel rows extend transversely of the string rows, and represent frets of the instrument. A plurality of apertures are provided in regularly spaced, longitudinal alignment along each string row, and in regularly spaced, transverse alignment relative to the string rows. A chord card fits in a slot provided behind the apertures between the front stringboard wall and a card-supporting wall located behind and spaced from the front stringboard wall. The card includes a designation of a chord and a fret, an index for alignment with a fret row, and a designation of fingers located for alignment with appropriate apertures when the index is aligned with a fret row to indicate visually through the apertures the finger placement on the strings.

With this structural arrangement, the simulated stringboard provided on the front stringboard wall is visible at all times because the chord card is located behind the front stringboard wall. Moreover, it is readily determined what the finger placement is on the strings of an instrument because such designations are immediately sighted through the apertures formed in the front stringboard wall.

In the present device, the apertures are arranged in spaced, transverse alignment between adjacent transverse fret rows.

In the arrangement of the simulated stringboard provided on the front stringboard wall, the string rows have numbers at one end of the rows, such numbers indicating the instrument strings in sequence from bottom to top of the instrument stringboard. Moreover, the fret rows have numbers at the top of the rows, such numbers indicating the instrument frets in sequence along the instrument stringboard relative to the string rows, the fret rows each having a register point for selective alignment with a chord card index of a card located in the slot behind the front stringboard wall.

The slot in which the chord card is located, is open at the top substantially between opposed end walls extending between the front stringboard wall and the card-supporting wall for sliding movement of the chord card in the slot to align the card index with any one of the fret register points. Further, the slot is of a depth slightly greater than the thickness of the chord card so that the card is held substantially parallel to the front stringboard wall.

BRIEF DESCRIPTION OF THE DRAWING

FIG. 1 is a front elevational view of the chord-teaching device with a chord card located in place, FIG. 2 is a top plan view of the device shown in FIG. 1, FIG. 3 is a cross sectional view of the device on FIG. 3—3 of FIG. 1, and FIG. 4 is a front elevational view of a chord card.

DESCRIPTION OF THE PREFERRED EMBODIMENT

The chord-teaching device is adapted to teach chords for a stringed instrument such as a guitar having a stringboard with strings and frets. The device includes an elongate, substantially rectangular box generally indicated by 10 having a front stringboard wall 11, a rear wall 12 spaced behind the front stringboard wall, and interconnecting, opposed end walls 13. A bottom wall 14 extends between and interconnects the front stringboard wall 11 and rear wall 12 slightly above the lower margins 15 of such walls 11 and 12. It will be understood that the lower wall margins 15 will support the box 10 on a subjacent surface such as a table.

Located behind and spaced from the front stringboard wall 11 is an intermediate card-supporting wall 16. The front stringboard wall 11 and card-supporting wall 16 provide a slot 17 located therebetween, the purpose and function of the slot 17 being described in detail upon later description of parts.

A plurality of parallel rows 20 are provided on the front stringboard wall 11, the rows 20 extending longitudinally and representing the strings of the instrument. Also provided on the stringboard wall 11 are a plurality of parallel rows 21 extending transversely of the string rows 20, and representing the frets of the instrument. Formed in the front stringboard wall 11 are a plurality of apertures 22, the apertures 22 being disposed in regularly spaced, longitudinal alignment along each string row 20, and in regularly spaced, transverse alignment relative to such string rows 20. More particularly, the apertures 22 are arranged in spaced, transverse alignment between adjacent transverse fret rows 21.

As is best seen in FIG. 1, the front stringboard wall 11 is provided with numbers (1–6) at one end of the string rows 20, the numbers (1–6) indicating the instrument strings in sequence from bottom to top of the instrument stringboard. For example, in the embodiment disclosed, there are six string rows representing in order the six strings on a stringboard of a stringed instrument such as a guitar. The front stringboard wall 11 is provided with numbers (1–15) at the top of the fret rows 21, such numbers (1–15) indicating the instrument frets in sequence along the stringboard relative to the string rows 20. These numbered fret rows 21 designate the particular frets on a stringboard of a stringed instrument.

For reasons which will be explained, each fret row 21 has a register point 23 extending to the top margin 28 of the front stringboard wall 11.

A plurality of chord cards generally indicated by 24 in FIGS. 1 and 4 are utilized with the box 10. Each card 24 is provided with information relating to a particular chord and fret at each end. For example, in FIG. 4, the card 24 includes information at one end giving the designation of a chord "C Major" and a fret "Fret 3." An index 25 shown by an arrow is provided on the card 24 and is adapted for alignment with an appropriate register point 23. Also provided on the card 24 are designations of fingers 26 which are judiciously located for alignment with appropriate apertures 22 when the index 25 is aligned with the register point 23 for fret row number (3), whereby to indicate visually through the apertures 22 the finger placement on the strings to achieve chord "C Major."

When the card 24 is reversed, it can be utilized for teaching the finger placement of a different chord. The card 24 illustrated in FIG. 4 shows a designation of a chord "D Seventh" and fret "Fret 2." A similar index 25A is provided on the card 24 for appropriate placement of the card 24 in the box 10. For the particular chord and fret, this end of the card 24 is provided with designations of the fingers 27 which are intentionally located for alignment with appropriate apertures 22 when the index 25A is aligned with the register point for fret row number (2) to indicate visually through the apertures 22 the placement of the fingers on the strings to achieve the designated chord "D Seventh."

The slot 17 is of a depth slightly greater than the thickness of the chord card 24 so that the card 24 is held substantially parallel and close to the front stringboard wall 11 so that the designations of the fingers 26 will show clearly through the apertures 22. The slot 17 is open at the top so that the card 24 can be slidably moved and adjusted to enable and facilitate alignment of the card index 25 with any one of the register points 23 of the fret rows 21.

It is thought that the functional advantages of the chord-teaching device have become fully apparent from the foregoing detailed description of parts, but for completeness of disclosure the usage will be briefly described. First, the particular chord card 24 containing the information relating to the chord desired, is selected. For example it will be assumed that the user wishes to learn the finger placements for the chord "C Major."

The particular chord card 24 is located in the slot 17 between the front stringboard wall 11 and the card-supporting wall 16 with the chord designation "C Major" visible over the upper margin 28 of the front stringboard wall 11. Since the fret designation is "Fret 3," the index 25 is aligned with the register point 23 for the fret row 21 numbered (3). Automatically, the designations of the fingers 26 are aligned behind the appropriate apertures 22 on the string rows 20. From FIG. 1, it will be apparent that finger No. 1 is placed on string No. 2, finger No. 2 is placed on string No. 4, and finger No. 3 is placed on string No. 5.

The compartment 30 provided between the card-supporting wall 16 and the rear wall 12 is utilized to store a plurality of chord cards 24 when such cards are not in use.

I claim as my invention:

1. A device for teaching chords for a stringed instrument including a stringboard having strings and frets, the device comprising:
   a. an elongate box having a front stringboard wall, the front stringboard wall including:
      1. a plurality of parallel rows extending longitudinally, and representing the strings of the instrument,
      2. a plurality of parallel rows extending transversely of the string rows, and representing the frets of the instrument, and
      3. a plurality of apertures in regularly spaced, longitudinal alignment along each string row, and in regularly spaced transverse alignment relative to the string rows,
   b. a card-supporting wall behind and spaced from the front stringboard wall to provide a slot behind the apertures, and
   c. a chord card fitting in the slot, the card including:
      1. a designation of a chord and a fret,
      2. an index for alignment with a fret row, and
      3. a designation of fingers located for alignment with appropriate apertures when the index is aligned with a fret row to indicate visually through the apertures the finger placement on the strings.

2. A device as defined in claim 1, in which:
   d. the apertures are arranged in spaced, transverse alignment between adjacent transverse fret rows.

3. A device as defined in claim 1, in which:
   d. the string rows have numbers at one end of the rows, the numbers indicating the instrument strings in sequence from bottom to top of the instrument stringboard, and
   e. the fret rows have numbers at one end of the rows, the numbers indicating the instrument frets in sequence along the instrument stringboard relative to the string rows, the fret rows each having a register point for selective alignment with a chord card index.

4. A device as defined in claim 1, in which:
   d. the elongate box includes opposed end walls and a bottom wall between the front stringboard wall and the card-supporting wall,
   e. the slot is open at the top substantially between the opposed end walls, and
   f. the chord card seats on the bottom wall.

5. A device as defined in claim 4, in which:
   g. the slot is of a depth slightly greater than the thickness of the chord card so that the card is held substantially parallel to the front stringboard wall.

6. A device as defined in claim 1, in which:
   d. the elongate box includes opposed end walls between the front stringboard wall and the card-supporting wall, and
   e. the slot is continuous between the opposed end walls for sliding movement of the chord card in the slot to align the card index selectively with any one of the fret rows.

7. A device as defined in claim 1, in which:
   d. a rear wall is located behind and spaced from the card-supporting wall to provide a storage compartment therebetween for chord cards.

* * * * *